(12) United States Patent
Kim et al.

(10) Patent No.: US 9,615,385 B2
(45) Date of Patent: Apr. 4, 2017

(54) METHOD AND ACCESS POINT FOR EXCHANGING FRAMES WITH A STATION IN A WIRELESS COMMUNICATION SYSTEM

(71) Applicant: LG ELECTRONICS INC., Seoul (KR)

(72) Inventors: Jeongki Kim, Anyang-si (KR); Yongho Seok, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 14/436,370

(22) PCT Filed: Oct. 16, 2013

(86) PCT No.: PCT/KR2013/009250
§ 371 (c)(1),
(2) Date: Apr. 16, 2015

(87) PCT Pub. No.: WO2014/061994
PCT Pub. Date: Apr. 24, 2014

(65) Prior Publication Data
US 2015/0271850 A1    Sep. 24, 2015

Related U.S. Application Data

(60) Provisional application No. 61/714,706, filed on Oct. 16, 2012, provisional application No. 61/714,751, filed on Oct. 17, 2012.

(51) Int. Cl.
*H04W 74/08* (2009.01)
*H04W 72/04* (2009.01)
(Continued)

(52) U.S. Cl.
CPC ....... *H04W 74/08* (2013.01); *H04W 72/0406* (2013.01); *H04W 72/082* (2013.01); *H04W 84/12* (2013.01)

(58) Field of Classification Search
CPC ............. H04W 74/002; H04W 74/004; H04W 74/006; H04W 74/04; H04W 74/08; H04W 74/0808; H04W 74/0816
See application file for complete search history.

(56) References Cited

U.S. PATENT DOCUMENTS

2005/0141420 A1   6/2005  Li et al.
2009/0138603 A1   5/2009  Surineni et al.
(Continued)

FOREIGN PATENT DOCUMENTS

JP     2007-520932 A     7/2007
KR  10-2003-0018051 A    3/2003
(Continued)

OTHER PUBLICATIONS

Grandhi et al., "Consideration for early NAV indication," IEEE 802.11-12/0615r0, May 11, 2012, slides 1-9.

*Primary Examiner* — Pao Sinkantarakorn
(74) *Attorney, Agent, or Firm* — Birch, Stewart, Kolasch & Birch, LLP

(57) ABSTRACT

Disclosed is a method for transmitting a signal of an access point (AP), comprising the steps of receiving a first frame from a first STA; and transmitting a second frame including a response to the first frame to the first STA, wherein the second frame induces the transmission of a third frame for the first STA to make the second STA set a network allocation vector (NAV), and the second STA is an STA unable to sense the AP.

5 Claims, 19 Drawing Sheets

(51) Int. Cl.
*H04W 72/08* (2009.01)
*H04W 84/12* (2009.01)

(56) References Cited

U.S. PATENT DOCUMENTS

2009/0290521 A1* 11/2009 Itagaki .............. H04W 52/0261
370/311
2010/0014502 A1* 1/2010 Singh ................. H04W 74/002
370/343
2012/0230317 A1 9/2012 Kim et al.

FOREIGN PATENT DOCUMENTS

KR 10-2012-0089717 A 8/2012
WO WO 02/093831 A2 11/2002
WO WO 2011/065750 A2 6/2011

* cited by examiner

FIG. 18
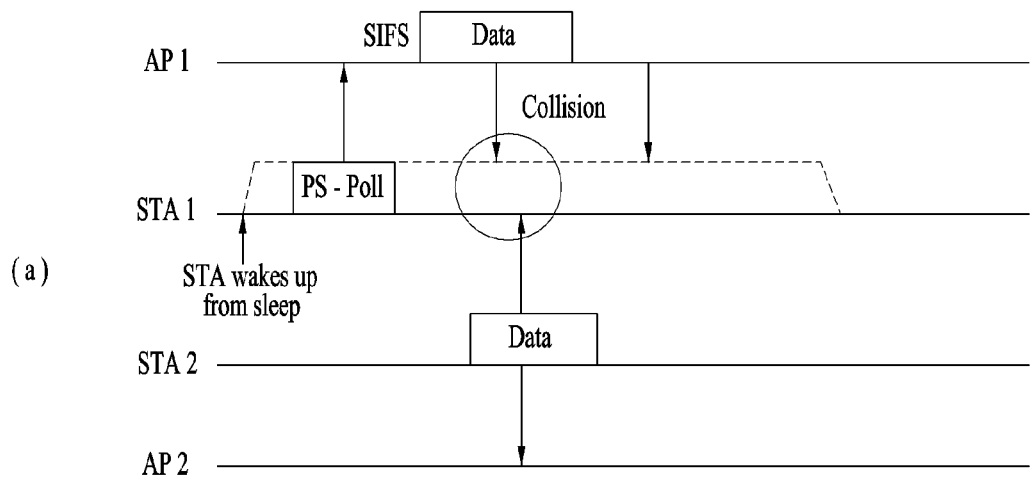
(a)
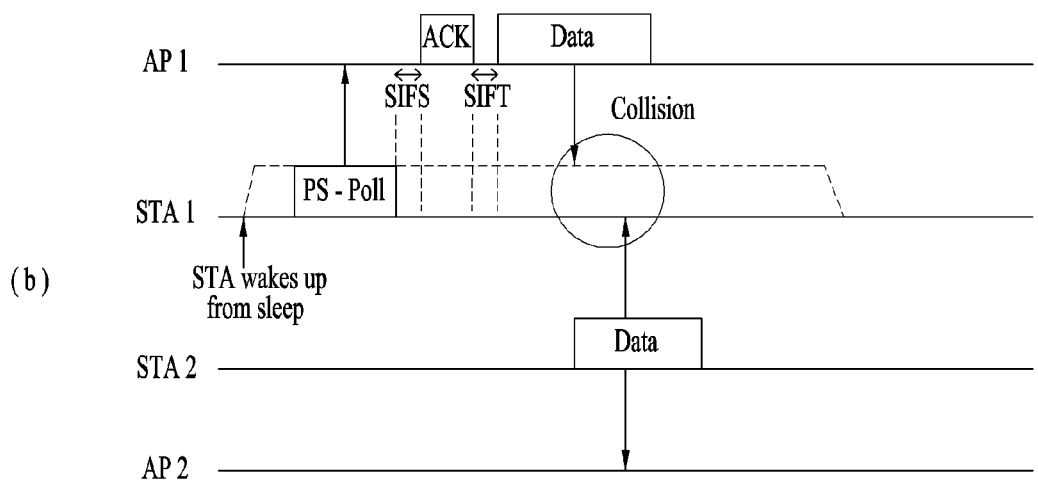
(b)

FIG. 20
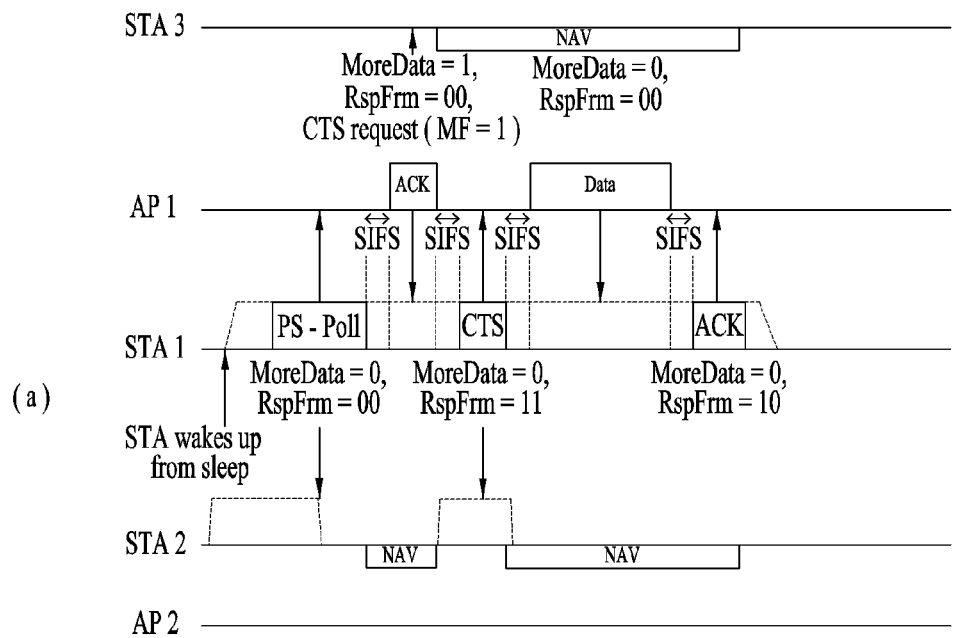
(a)
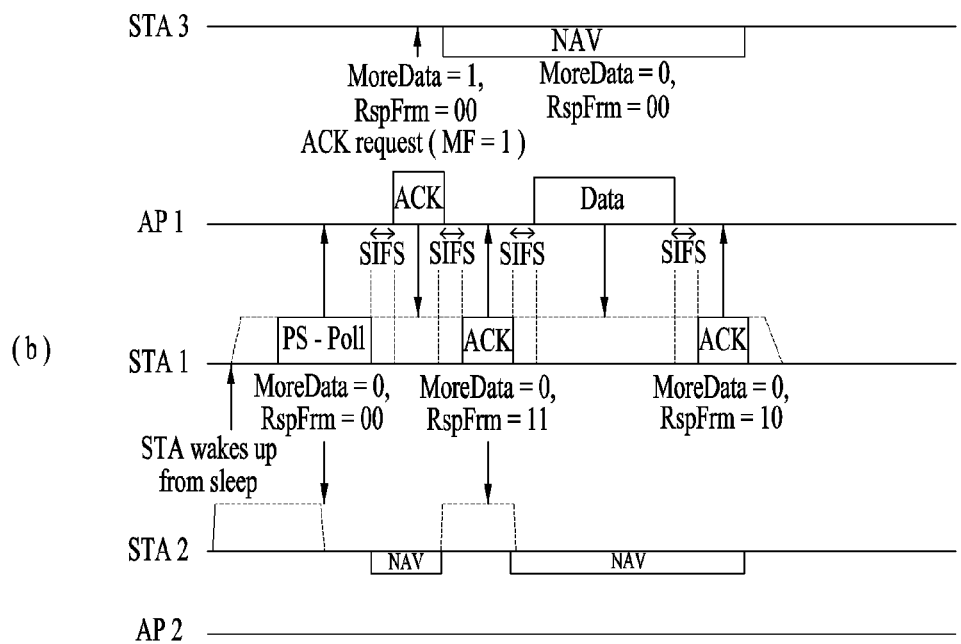
(b)

FIG. 21
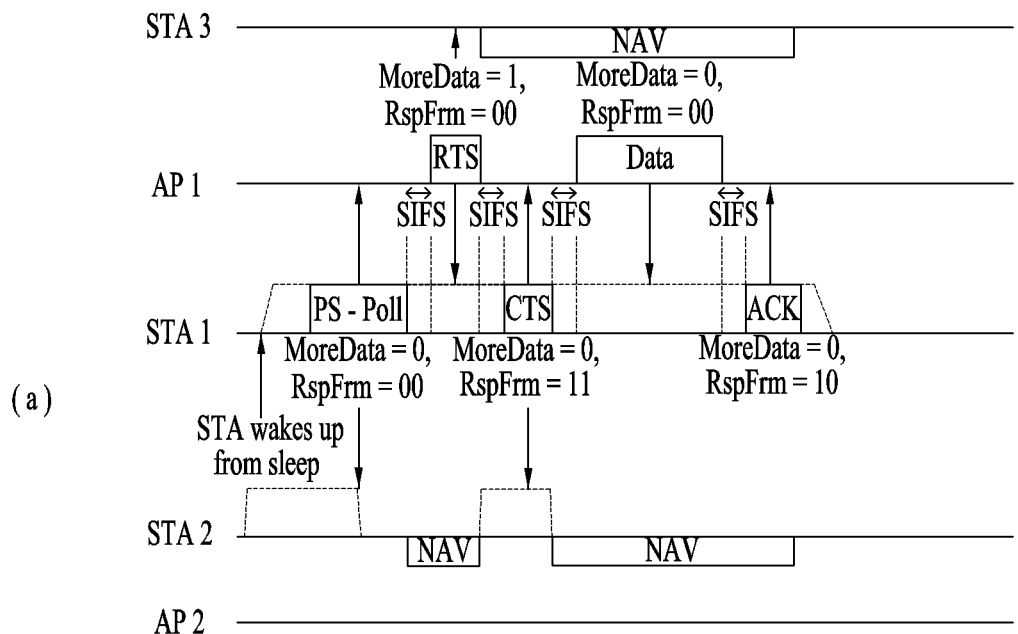
(a)
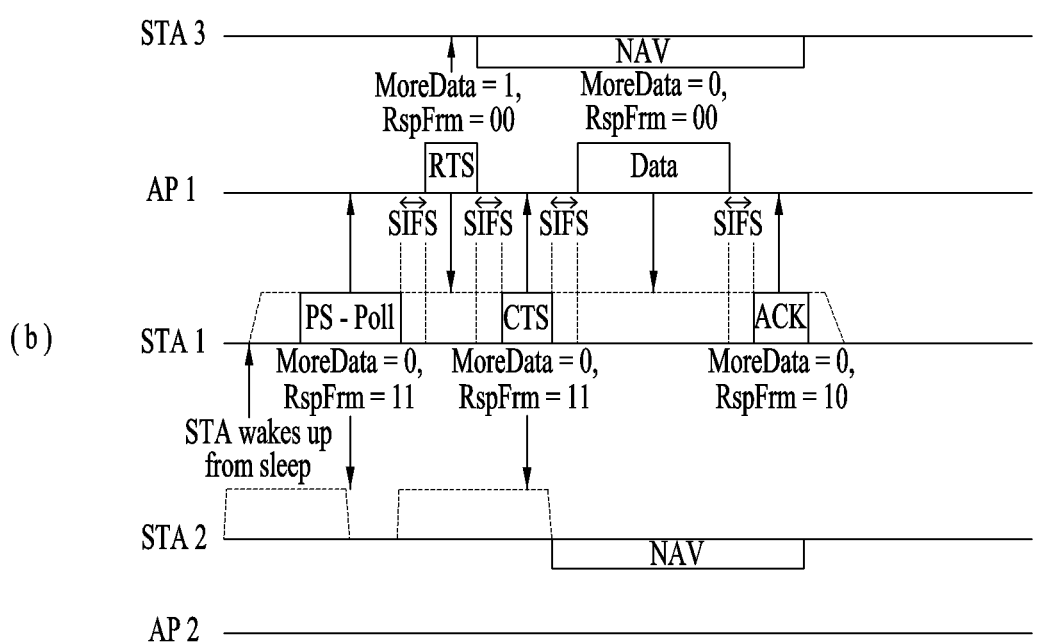
(b)

METHOD AND ACCESS POINT FOR EXCHANGING FRAMES WITH A STATION IN A WIRELESS COMMUNICATION SYSTEM

CROSS REFERENCE TO RELATED APPLICATIONS

This application is the National Phase of PCT International Application No. PCT/KR2013/009250, filed on Oct. 16, 2013, which claims priority under 35 U.S.C. 119(e) to U.S. Provisional Application No. 61/714,706, filed on Oct. 16, 2012, and to U.S. Provisional Application No. 61/714,751, filed on Oct. 17, 2012, all of which are hereby expressly incorporated by reference into the present application.

TECHNICAL FIELD

The present invention relates to a wireless communication system, and more particularly, to a method and apparatus for transmitting a signal in a wireless LAN system.

BACKGROUND ART

Various wireless communication technologies systems have been developed with rapid development of information communication technologies. WLAN technology from among the wireless communication technologies allows wireless Internet access at home or in enterprises or at a specific service zone using mobile terminals, such as a Personal Digital Assistant (PDA), a laptop computer, a Portable. Multimedia Player (PMP), etc. on the basis of Radio. Frequency (RF) technology.

In order to obviate limited communication speed pointed out as a drawback in the WLAN, the recent technical standard has proposed an evolved system capable of increasing the speed and reliability of a network while simultaneously extending a coverage region of a wireless network. For example, IEEE 802.11n enables a data processing speed to support high throughput (HT) of maximum 540 Mbps. In addition, Multiple. Input and Multiple Output (MIMO) technology has recently been applied to both a transmitter and a receiver so as to minimize transmission errors as well as to optimize a data transfer rate.

Machine to Machine (M2M) communication technology has been discussed as next generation communication technology. A technical standard for supporting M2M communication in IEEE 802.11 WLAN system has been developed as IEEE 802.11ah. M2M communication may consider a scenario capable of sometimes communicating a small amount of data at low speed in an environment where a large number of devices exist.

In the wireless LAN system, communication is performed in a medium shared between all the devices. If the number of devices is increased in the same manner as M2M communication, it is required to more efficiently improve a channel access mechanism to reduce unnecessary power consumption and occurrence of interference.

DISCLOSURE

Technical Problem

An object of the present invention is to provide a method for transmitting and receiving a signal between an AP and an STA to minimize an influence of interference caused by a hidden node.

The technical objects that can be achieved through the present invention are not limited to what has been particularly described hereinabove and other technical objects not described herein will be more clearly understood by persons skilled in the art from the following detailed description.

Technical Solution

In a first technical aspect of the present invention, a method for transmitting a signal of an access point (AP) in a wireless communication system comprises the steps of receiving a first frame from a first STA; and transmitting a second frame including a response to the first frame to the first STA, wherein the second frame induces the transmission of a third frame to allow the first STA to make a second STA set a network allocation vector (NAV), and the second STA is an STA unable to sense the AP.

In a second technical aspect of the present invention, an AP in a wireless communication system comprises a transceiving module; and a processor, wherein the processor receives a first frame from a first STA and transmits a second frame including a response to the first frame to the first STA, the second frame induces the transmission of a third frame to allow the first STA to make a second STA set a network allocation vector (NAV), and the second STA is an STA unable to sense the AP.

The first and second technical aspects may include one or more of the followings.

The method may further comprise the steps of receiving the third frame; transmitting a fourth frame, which includes downlink data, to the first STA; and receiving a fifth frame which is a response to the downlink data, from the first STA.

The NAV set after the second STA receives the second frame may have a length of (2*SIFS+length of the fourth frame+length of the fifth frame) or more.

The NAV set after the second STA receives the first frame may have a length of (SIFS+length of the first frame+length of the second frame).

The second frame may include information requesting the third frame.

The third frame may include information indicating that data is transmitted after SIFS even though there is no data to be transmitted from the first STA.

The third frame may include a MoreData field value set to 0.

The first frame may be a PS-Poll frame, the fourth frame may be a data frame, and the fifth frame may be an ACK frame.

The second frame may be any one of an ACK frame and an RTS frame, and the third frame may be any one of the ACK frame and a CTS frame.

If the second frame is an RTS frame, the first frame may include information indicating that a frame other than the ACK frame will be transmitted after SIFS.

The first frame may be an uplink data frame, the second frame may be any one of ACK frame and RTS frame, and the third frame may be any one of the ACK frame and the CTS frame.

The first frame may be the RTS frame, the second frame may be the CTS frame, the third frame may be an uplink data frame, the fourth frame may be a downlink data frame, and the fifth frame may be the ACK frame.

If the second frame includes an urgent data indicator, a predetermined data frame may be transmitted to the first STA before the third frame is received, and the predetermined data frame may be smaller than the uplink data frame.

Advantageous Effects

According to the present invention, an influence of interference caused by a hidden node may be minimized.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 17 to 25 are diagrams illustrating the embodiments of the present invention.

BEST MODE FOR CARRYING OUT THE INVENTION

Figure 1:
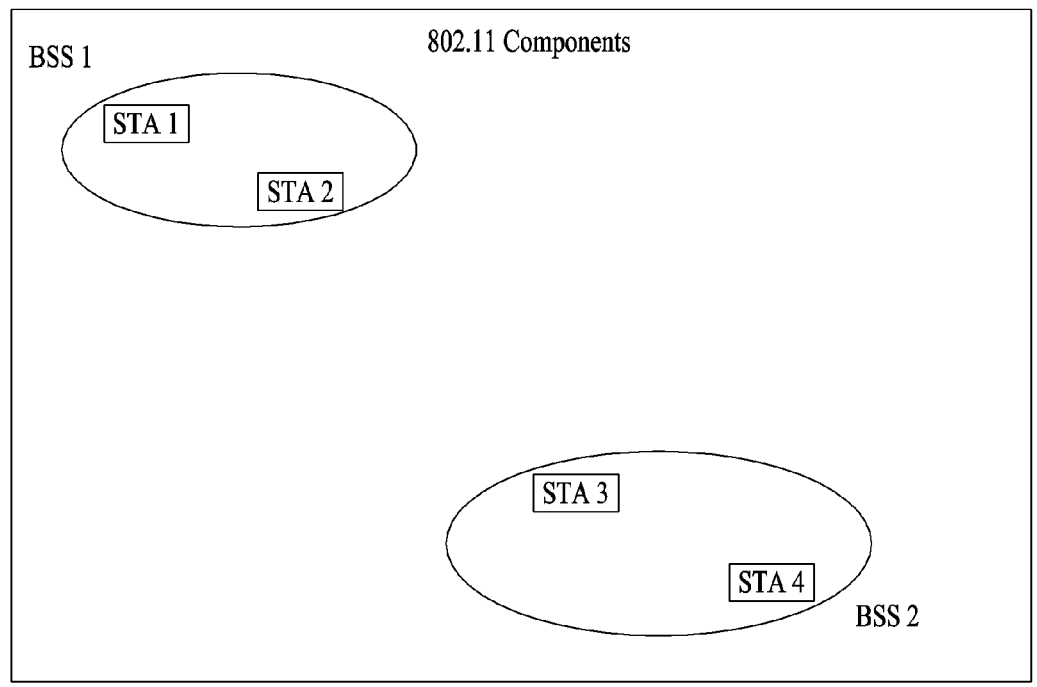
FIG. 1 is a diagram illustrating an exemplary structure of an IEEE 802.11 system to which the present invention may be applied.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
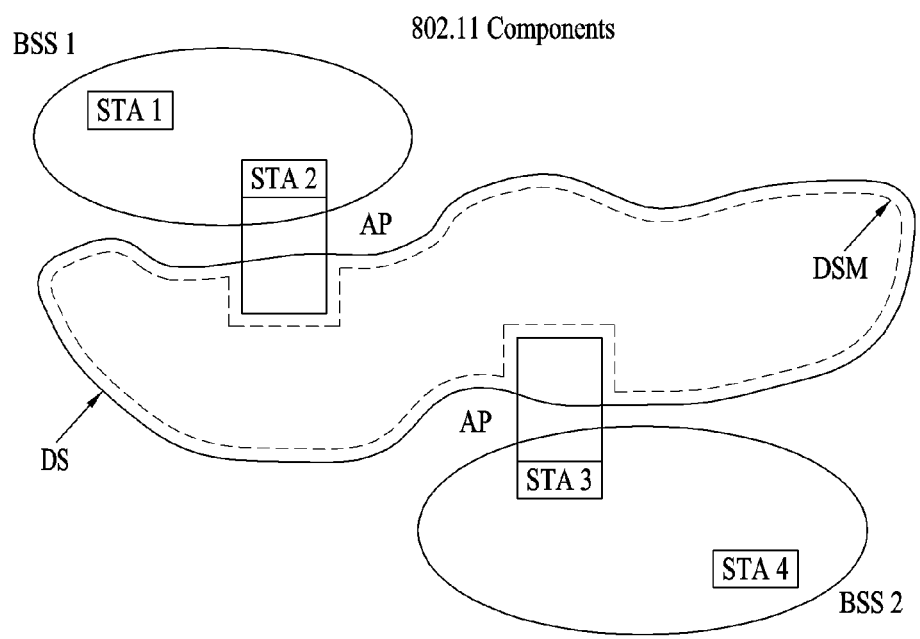
FIG. 2 is a diagram illustrating another exemplary structure of an IEEE 802.11 system to which the present invention may be applied.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
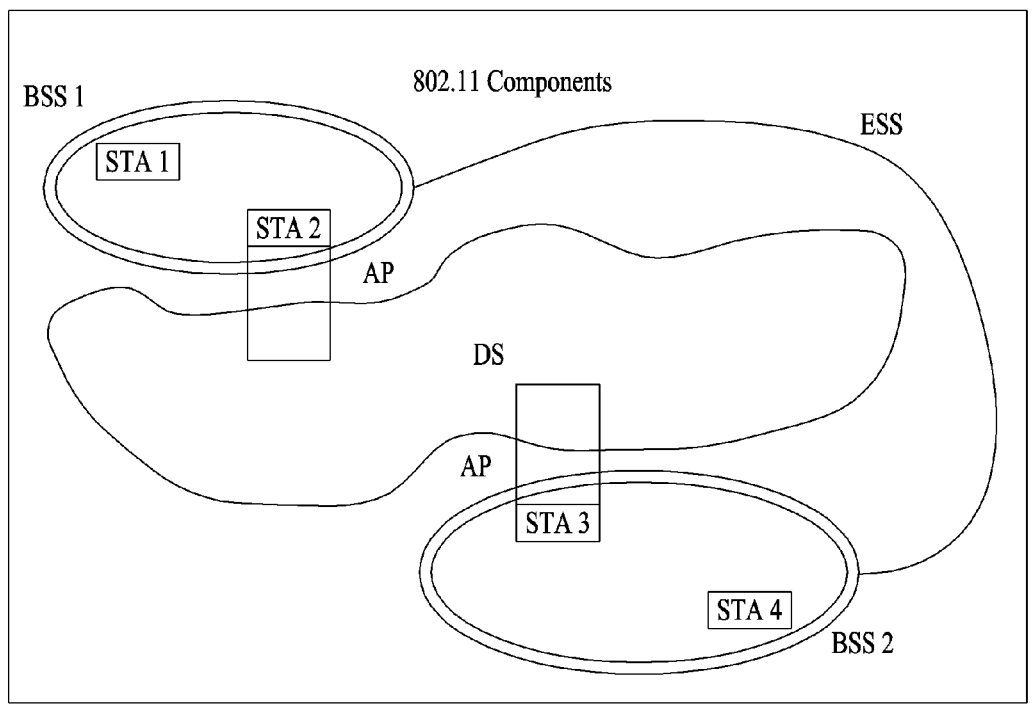
FIG. 3 is a diagram illustrating other exemplary structure of an IEEE 802.11 system to which the present invention may be applied.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
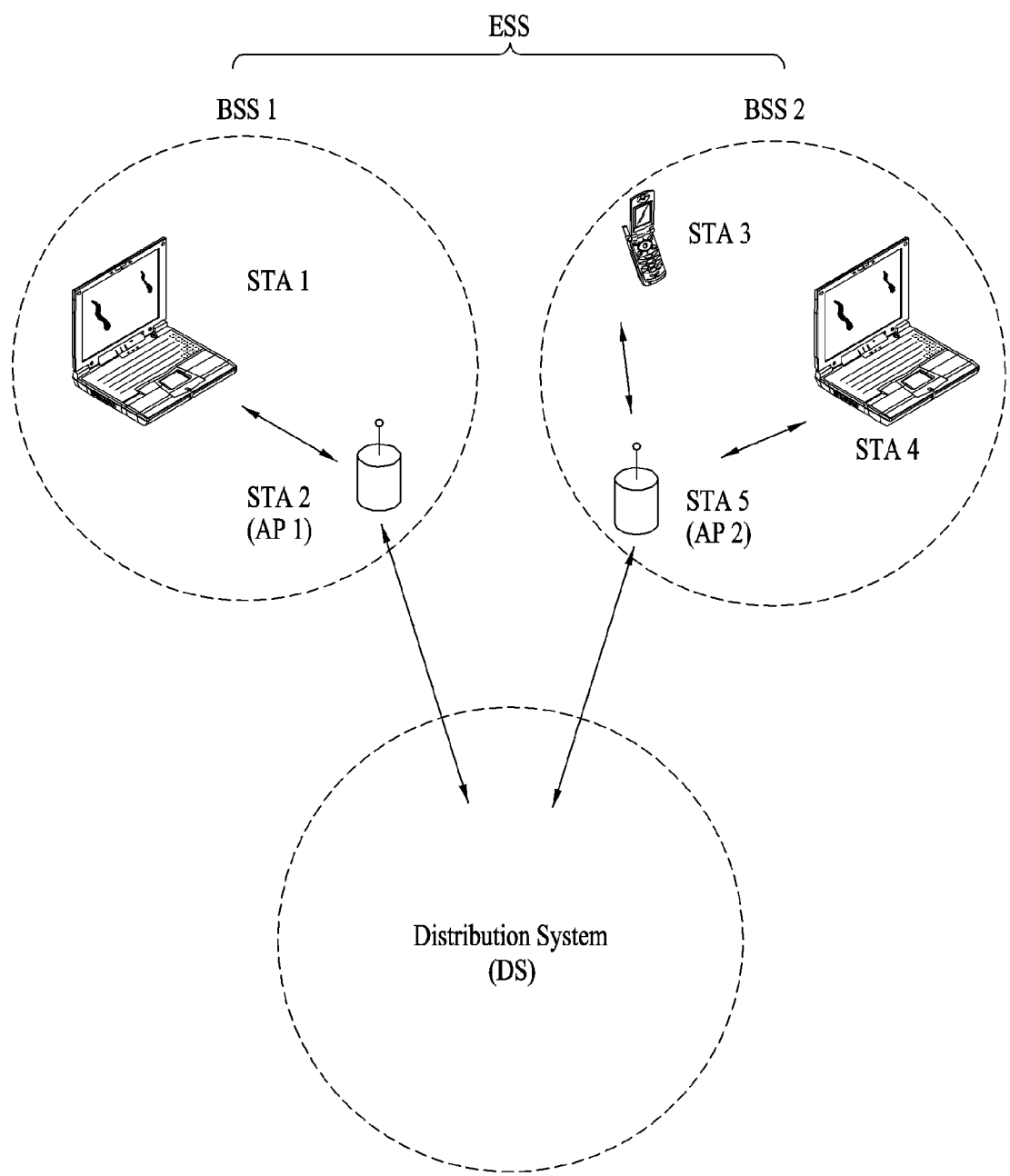
FIG. 4 is a diagram illustrating an exemplary structure of a wireless LAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
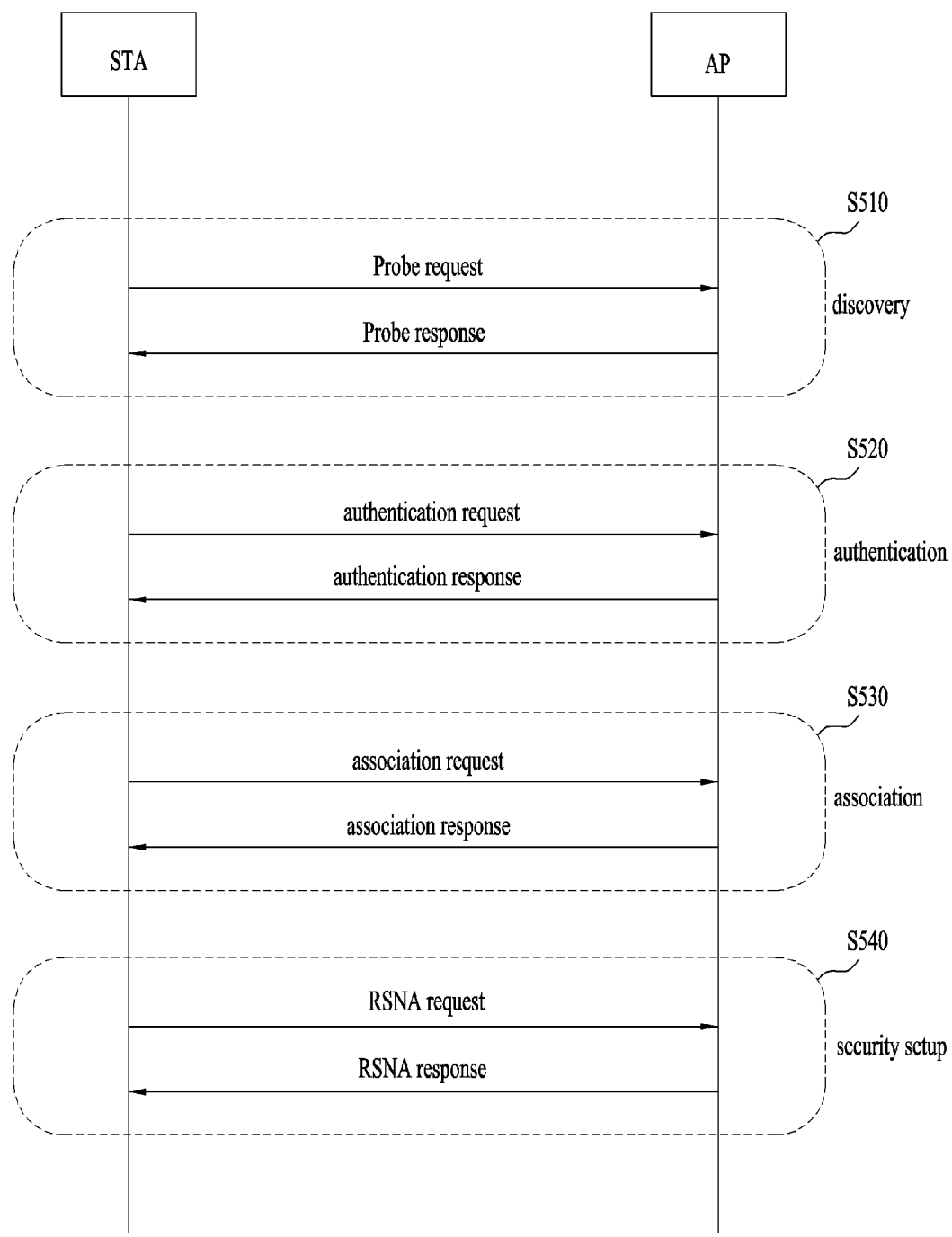
FIG. 5 is a diagram illustrating a link setup process in a wireless LAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
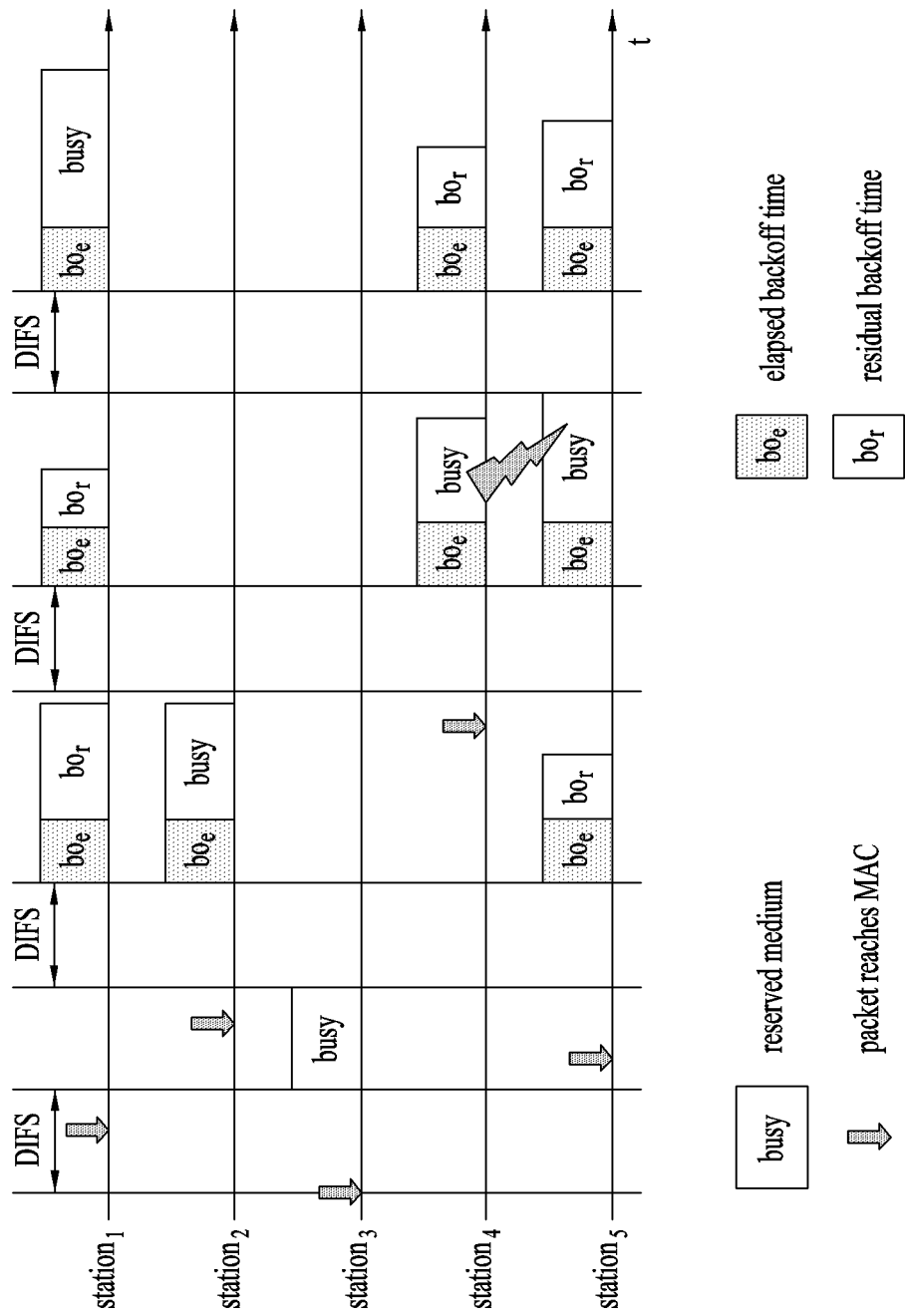
FIG. 6 is a diagram illustrating a backoff process.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to $2^n-1$ (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
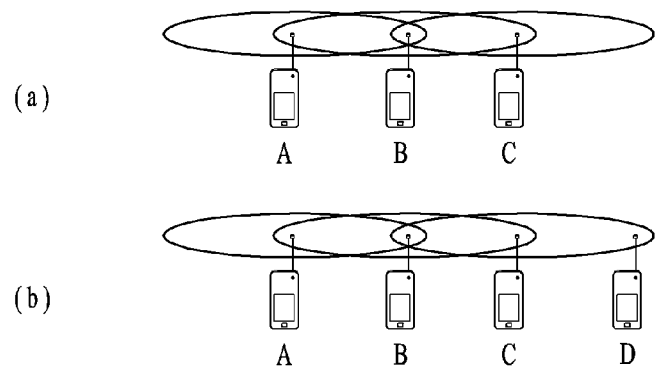
FIG. 7 is a diagram illustrating a hidden node and an exposed node.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
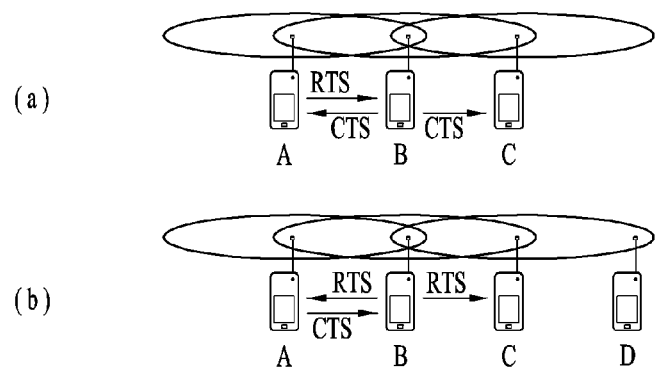
FIG. 8 is a diagram illustrating RTS and CTS.

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs.

For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
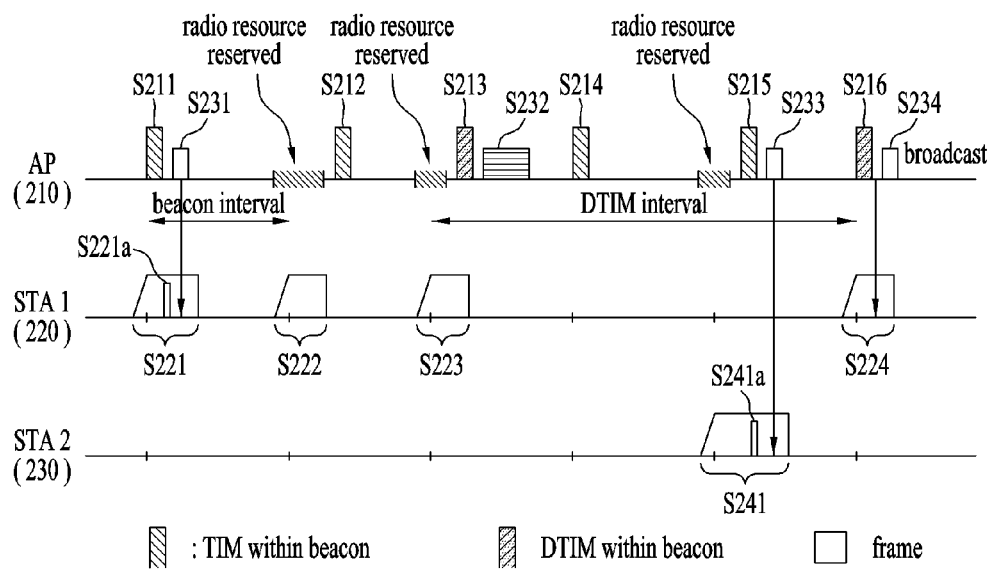
FIG. 9 is a diagram illustrating a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
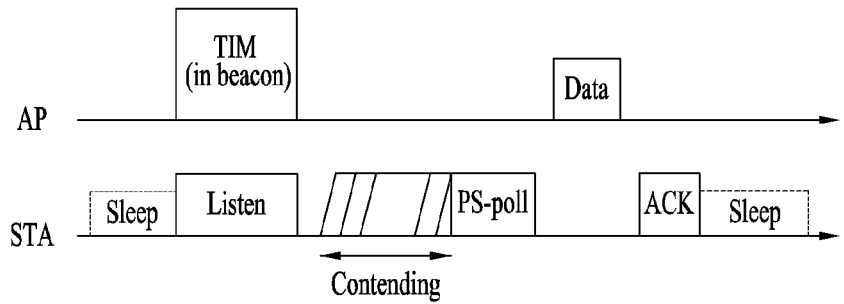
FIGS. 10 to 12 are detailed diagrams illustrating an operation of an STA that has received TIM.
Figure 11:
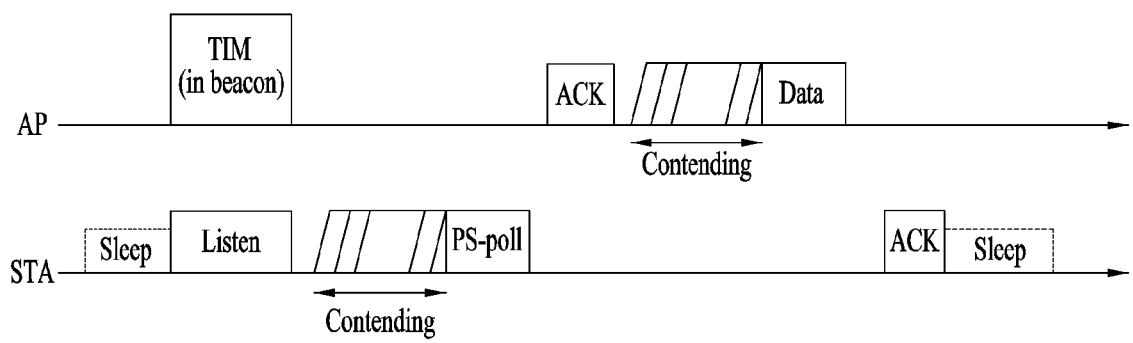
Figure 12:
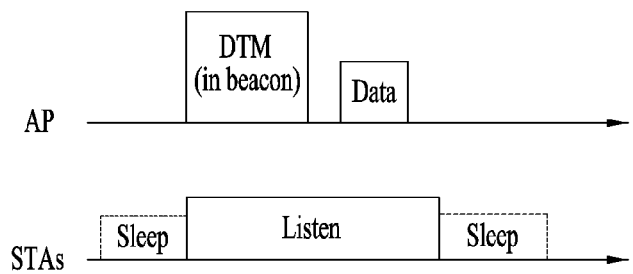

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM.

STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In the operation and management method of the PS mode based on the TIM (or DTIM) protocol described with reference to FIGS. 9 to 12, STAs may determine whether a data frame to be transmitted for the STAs through STA identification information contained in a TIM element. The STA identification information may be information associated with an AID to be allocated when an STA is associated with an AP.

The AID is used as a unique ID of each STA within one BSS. For example, the AID for use in the current WLAN system may be allocated as one of 1 to 2007. In the currently defined WLAN system, 14 bits for the AID may be allocated to a frame transmitted by an AP and/or an STA. Although the AID value may be assigned up to 16383, the values of 2008 to 16383 are set to reserved values.

A TIM element according to legacy definition is inappropriate to apply an M2M application through which many STAs (for example, more than 2007 STAs) are associated with one AP. If a conventional TIM structure is extended without any change, since the TIM bitmap size excessively increases, it is impossible to support the extended TIM structure using a legacy frame format and the extended TIM structure is inappropriate for M2M communication in which application of a low transfer rate is considered. In addition, it is expected that there are a very small number of STAs each having a reception data frame during one beacon period. Therefore, according to exemplary application of the above-mentioned M2M communication, since it is expected that most bits are set to zero (0) although the TIM bitmap size is increased, technology capable of efficiently compressing a bitmap is needed.

In legacy bitmap compression technology, successive values of 0 are omitted from a front part of a bitmap and the omitted result may be defined as an offset (or start point) value. However, although STAs each including a buffered frame is small in number, if there is a high difference between AID values of respective STAs, compression efficiency is not high. For example, assuming that only a frame to be transmitted to two STAs having AID values of 10 and 2000 is buffered, the length of a compressed bitmap is set to 1990 but the remaining parts other than both end parts are assigned zero. If fewer STAs are associated with one AP, inefficiency of bitmap compression does not cause serious problems. However, if the number of STAs associated with one AP increases, such inefficiency may deteriorate overall system performance.

Figure 13:
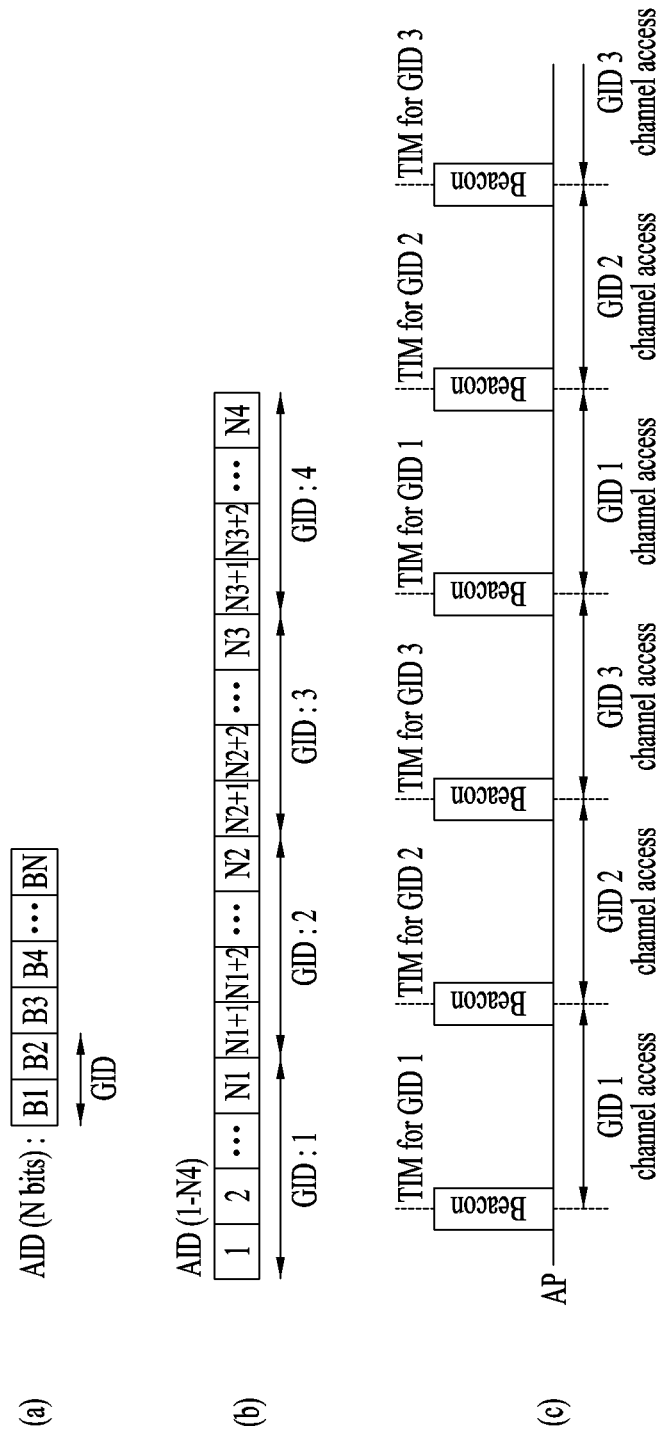
FIG. 13 is a diagram illustrating group based AID.

In order to solve the above-mentioned problems, AIDs are divided into a plurality of groups such that data can be more efficiently transmitted. A designated group ID (GID) is allocated to each group. AIDs allocated on a group basis will be described with reference to FIG. 13.

FIG. 13(a) is a diagram illustrating an exemplary group-based AID. In FIG. 13(a), a few bits located at the front part of an AID bitmap may be used to indicate a GID. For example, it is possible to designate four GIDs using the first two bits of an AID bitmap. If a total length of the AID bitmap is N bits, the first two bits (B1 and B2) may represent a GID of the corresponding AID.

FIG. 13(a) is a diagram illustrating another exemplary group-based AID. In FIG. 13(b), a GID may be allocated according to the position of the AID. In this case, AIDs having the same GID may be represented by offset and length values. For example, if GID 1 is denoted by offset A and length B, this means that AIDs of A to A+B−1 on a bitmap have GID 1. For example, FIG. 13(b) assumes that AIDs of 1 to N 4 are divided into four groups. In this case, AIDs contained in GID 1 are denoted by 1 to N 1 and the AIDs contained in this group may be represented by offset 1 and length N1. Next, AIDs contained in GID 2 may be represented by offset N 1+1 and length N 2 −N 1+1, AIDs contained in GID 3 may be represented by offset N2+1 and length N3−N2+1, and AIDs contained in GID 4 may be represented by offset N3+1 and length N4−N3+1.

If the aforementioned group-based AIDs are introduced, channel access may be allowed in a different time interval according to GIDs, so that the problem caused by the insufficient number of TIM elements with respect to a large number of STAs can be solved and at the same time data can be efficiently transmitted/received. For example, during a specific time interval, channel access is allowed only for STA(s) corresponding to a specific group and channel access to the remaining STA(s) may be restricted. A predetermined time interval in which access to only specific STA(s) is allowed may also be referred to as a restricted access window (RAW).

Channel access based on GID will now be described with reference to FIG. 13(c). FIG. 13(c) exemplarily illustrates a channel access mechanism according to a beacon interval when AIDs are divided into three groups. A first beacon interval (or a first RAW) is a specific interval in which channel access to STAs corresponding to AIDs contained in GID 1 is allowed and channel access of STAs contained in other GIDs is disallowed. To implement this, a TIM element used only for AIDs corresponding to GID 1 is contained in a first beacon. A TIM element used only for AIDs corresponding to GID 2 is contained in a second beacon frame. Accordingly, only channel access to STAs corresponding to the AIDs contained in GID 2 is allowed during a second beacon interval (or a second RAW). A TIM element used only for AIDs having GID 3 is contained in a third beacon frame, so that channel access to STAs corresponding to the AIDs contained in GID 3 is allowed during a third beacon interval (or a third RAW). A TIM element used only for AIDs having GID 1 is contained in a fourth beacon frame, so that channel access to STAs corresponding to the AIDs contained in GID 1 is allowed during a fourth beacon interval (or a fourth RAW). Thereafter, only channel access to STAs belonging to a specific group indicated by a TIM contained in a corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is cyclical or periodic according to the beacon interval, the scope of the present invention is not limited thereto. That is, only AID(s) contained in specific GID(s) may be contained in a TIM element, so that channel access only to STA(s) corresponding to the specific AID(s) is allowed during a specific time interval (e.g. a specific RAW) and channel access to the remaining STA(s) is disallowed.

The aforementioned group-based AID allocation scheme may also be referred to as a hierarchical structure of a TIM. That is, a total AID space is divided into a plurality of blocks and channel access to STA(s) (i.e. STA(s) of a specific group) corresponding to a specific block having any one of values other than '0' may be allowed. Therefore, since a large-sized TIM is divided into small-sized blocks/groups, an STA can easily maintain TIM information and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of an AID bitmap may represent a page ID (i.e. PID), the next N2 bits may represent a block ID, the next N3 bits may represent a sub-block ID, and the remaining bits may represent the position of STA bits contained in a sub-block.

In the embodiments of the present invention described below, various schemes for dividing STAs (or AIDs allocated to the STAs respectively) into predetermined hierarchical group units and managing the same may be used, but the group-based AID allocation schemes are not limited to these embodiments.

Improved Channel Access Method

If AID is allocated/managed based on group, STAs which belong to a specific group may use a channel at a "group channel access interval" (or RAW) only allocated to the corresponding group. If the STA supports M2M application, traffic for the corresponding STA may occur in accordance with a long period (for example, several ten minutes or several hours). Since such STA does not need to maintain an awake state frequently, it is preferable that the STA is operated in a sleep mode for a long time and is sometimes switched to the awake state (that is, wakeup interval of the corresponding STA is set for a long time). The STA having a wakeup interval of a long period may be referred to as "long-sleeper" or STA operated in a "long-sleep" mode. However, the reason why that the wakeup interval is set for a long time is not limited to be necessarily intended for M2M communication. The wakeup interval may be set for a long time depending on the state of the STA or peripheral condition even in a general WLAN operation.

If the wakeup interval is set, the STA may determine whether the wakeup interval passed, on the basis of its local clock. However, since it is general that an oscillator of a low cost is used as the local clock of the STA, it is likely that error occurs. Moreover, if the STA is operated in a long-sleep mode, the error may be more increased in accordance with the passage of time. Therefore, time synchronization of the STA which wakes up sometimes may not be matched with time synchronization of the AP. For example, although the STA is switched to the awake state by calculating timing for receiving its beacon, the STA may fail to actually receive the beacon, which is transmitted from the AP, at the corresponding timing. That is, the STA may miss the beacon frame due to clock drift. This problem may occur frequently if the STA is operated in a long-sleep mode.

Figure 14:
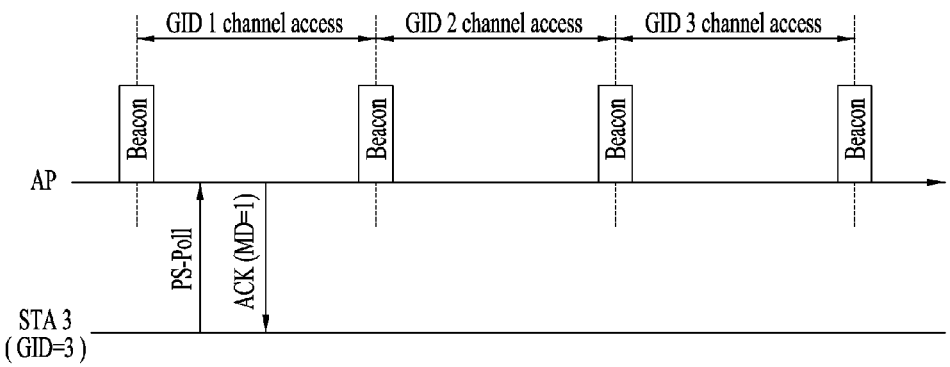
FIGS. 14 to 16 are diagrams illustrating examples of operation of an STA when group channel access interval is set.
Figure 15:
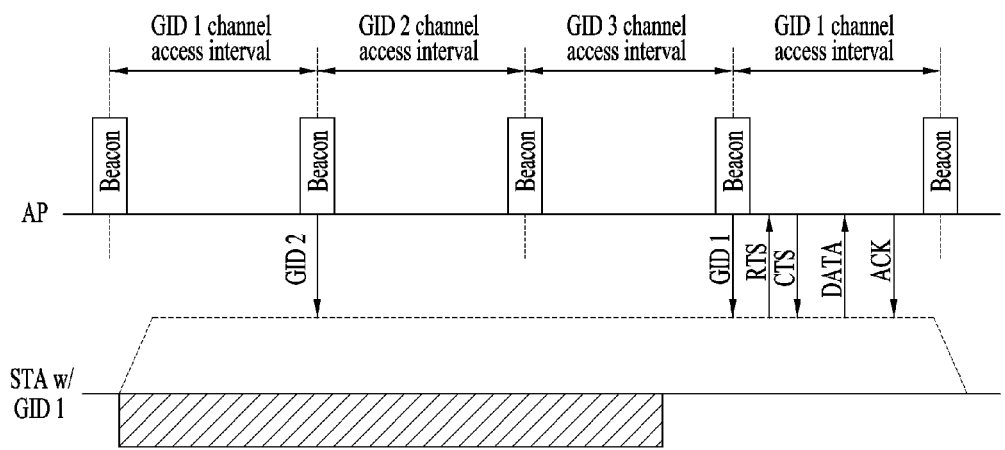
Figure 16:
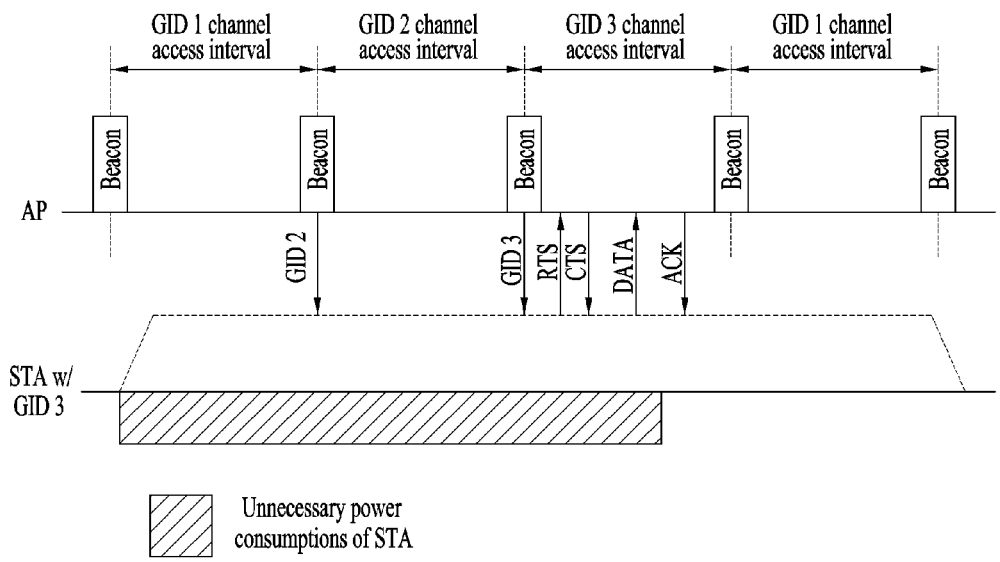

FIGS. 14 to 16 are diagrams illustrating examples of operation of an STA when group channel access interval is set.

In the example of FIG. 14, STA3 is STA which belongs to group 3 (that is, GID=3), and may perform PS-Poll for requesting the AP of frame transmission by waking up from a channel access interval allocated to group 1 (that is, GID=1). The AP that has received the PS-Poll from the STA transmits ACK frame to the STA3, and may provide information (that is, information indicating that data to be transmitted exist) through the ACK frame if the AP has data buffered to be transmitted to the STA3. For example, the AP may indicate the information by setting a value of a "More Data" field (or MD field) of 1 bit size included in the ACK frame to 1 (that is, MD=1).

In this case, since the time when the STA3 has transmitted the PS-Poll belongs to the channel access interval of the group 1, the AP does not transmit data immediately after transmitting the ACK frame even though the AP has data to be transmitted to the STA3 but transmits data to the STA3 at a channel access interval (GID 3 channel access of FIG. 14) allocated to the group 3 to which the STA3 belongs.

Since the STA3 has received the ACK frame set to MD=1 from the AP, the STA3 continues to be on standby for data transmission from the AP. That is, in the example of FIG. 14, since the STA3 has not received the beacon immediately after waking up, on the assumption that the time when the STA3 wakes up may be the channel access interval allocated to the group to which the STA3 belongs, in accordance with calculation based on the local clock of the STA3 and that data to be transmitted to the STA3 may exist, the STA3 transmits PS-Poll to the AP. Alternatively, on the assumption that time synchronization may not be matched as the STA3 is operated in a long-sleep mode, if there are data to be transmitted to the STA3, the STA3 may transmit PS-Poll to the AP to receive the data. Since the ACK frame received by the STA3 from the AP indicates that there are data to be transmitted to the STA3, the STA3 continues to wait for data reception on the assumption that its channel access is an accepted interval. The STA3 consumes the power unnecessarily although data reception from information included in next beacon is not accepted until time synchronization is normally performed.

In particularly, if the STA3 is operated in the long-sleep mode, since the STA3 does not receive the beacon frequently, the STA3 may perform CCA even in case of no channel access interval to which the STA3 belongs, whereby unnecessary power consumption may occur.

Next, in the example of FIG. 15, STA having GID 1 (that is, STA which belongs to group 1) misses a beacon frame at the timing when the STA wakes up. That is, the STA that has not received the beacon that includes GID (or PID) allocated thereto continues to be on standby at an awake state until the beacon is received. That is, even though the time when the STA wakes up is the channel access interval allocated to the STA, the STA has not identified whether its GID (or PID) is included in TIM transmitted through the beacon, whereby the STA cannot know whether the corresponding timing is the channel access interval allocated to its group.

As described above, the STA which is switched from the sleep state to the awake state in the example of FIG. 15 continues to be on standby at the awake state until a fourth beacon that includes its GID (that is, GID 1) is received after missing the first beacon, whereby unnecessary power is consumed. As a result, the STA may receive the beacon, which includes GID 1, after consuming the unnecessary power, and thus may perform RTS transmission, CTS reception, data frame transmission, and ACK reception.

FIG. 16 illustrates that the STA wakes up at a channel access interval of another group. For example, the STA having GID 3 may wake up at the channel access interval of GID 1. That is, after waking up, the STA having GID 3 consumes the power unnecessarily until the beacon corresponding to its GID is received. If TIM indicating GID 3 in a third beacon is received, the STA may recognize the channel access interval of its group and perform data transmission and ACK reception after CCA through RTS, CTS, etc.

Speed Frame Exchange

Figure 17:
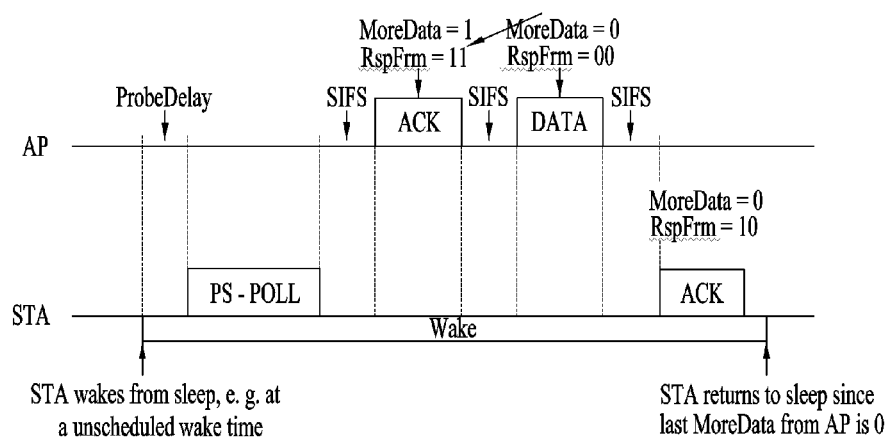

As described above, when the STA identifies downlink data to be transmitted from the AP by waking up from a power saving (PS) mode and receiving TIM of a beacon, the STA transmits PS-Poll to the AP. The AP that has received the PS-Poll may transmit data immediately after SIFS, or may transmit data through contending after transmitting ACK after SIFS. At this time, as shown in FIG. 17, the AP may transmit downlink data immediately (after SIFS) after transmitting ACK frame. This is referred to as speed frame exchange. In the speed frame exchange, in order to indicate that data are transmitted after SIFS after transmitting ACK, a value of RspFrm (response frame)/ACK indication field is set to 11. When the AP transmits data, in order to indicate that ACK frame is received later, RspFrm=00 is set. RspFrm indicates a response frame transmitted after corresponding frame transmission, and may be referred to as ACK indication. That is, RspFrm may indicate a corresponding ACK (normal ACK or Block ACK) which is transmitted. RspFrm=00 indicates that ACK frame is transmitted after SIFS, RspFrm=01 indicates that Block ACK is transmitted after SIFS, RspFrm=10 indicates that no frame is transmitted after SIFS, and RspFrm=11 indicates that another frame (that is, MPDU of data) other than ACK, CTS, and BA is transmitted after SIFS. However, mapping relation of the value of RspFrm frame and meaning indicated by the value may be different from the above description. For example, if the value of the ACK indication is 0, it may indicate 'No Response', if the value of the ACK indication is 1, it may indicate 'NDP Response', if the value of the ACK indication is 2, it may indicate 'Normal Response', and if the value of the ACK indication is 3, it may indicate 'Long Response'. In this case, NAV set by the third party STAs in accordance with each value may be understood with reference to 9.3.2.1, 9.3.2.4, 9.3.2.4a of IEEE P802.11ah/D1.0.

As described above, if the AP transmits data frame to the first STA immediately after receiving PS-Poll frame (FIG. 18(a)), or if the AP transmits data frame to the first STA immediately after receiving PS-Poll frame and then transmitting ACK frame (FIG. 18(b)), a second STA, which cannot sense the AP, that is, the second STA which is out of AP 1 range may transmit frame (for example, uplink data), whereby interference in allowing the first STA to receive the data transmitted from the AP may be reduced.

Therefore, embodiments for solving the above problem will be described in detail.

Embodiment

Figure 19:
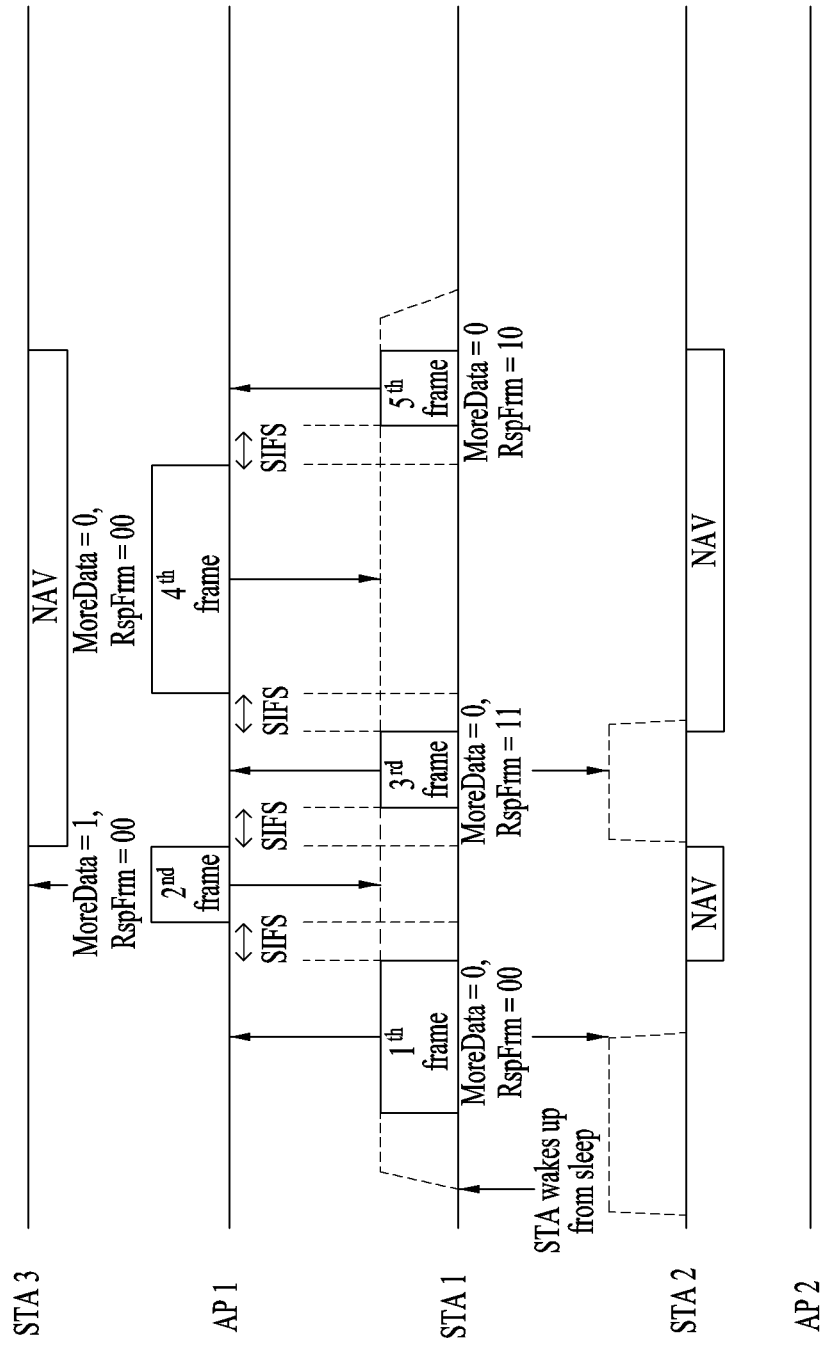

FIG. 19 illustrates one embodiment of the present invention. Referring to FIG. 19, AP 1 may receive a first frame from the first STA (STA 1), and may transmit a second frame, which includes a response to the first frame, to the first STA. Afterwards, the AP 1 may receive a third frame from the first STA, transmit a fourth frame, which includes downlink data, to the first STA, and receive a fifth frame, which is a response to the downlink data, from the first STA. In this case, the first frame may be one of PS-Poll frame, uplink data, and RTS frame, the second frame may be one of ACK frame and RTS frame, the third frame may be one of ACK frame and CTS frame, the fourth frame may be downlink data frame, and the fifth frame may be ACK frame. A detailed example of each case will be described later in detail with reference to FIGS. 20 to 25.

In a series of processes described as above, the second frame derives transmission of the third frame from the first STA to allow the second STA (STA 2) to set a Network Allocation Vector (NAV), and the second STA may be the STA (that is, STA which is out of AP 1 range) that cannot sense the AP 1 (in this case, it is assumed that the second STA can sense the first STA). To this end, the second frame may include information requesting the third frame. The third frame includes information (RspFrm) indicating that data are transmitted after SIFS based on the second frame (Moredata=1) even though the third frame has no data to be transmitted therefrom. As a result, the second STA may not cause interference when the first STA receives downlink data from the AP 1, by setting the NAV.

At this time, a length of the NAV may be (2*SIFS+length of the fourth frame+length of the fifth frame) or more. Also, the length of the NAV set after the second STA receives the first frame may be (SIFS+length of the first frame+length of the second frame).

Hereinafter, the embodiments shown in FIGS. 20 to 25 will be described.

In FIG. 20(a), the first frame is PS-Poll frame, the second frame is ACK frame, the third frame is CTS frame, the fourth frame is data frame, and the fifth frame is ACK frame. When the first STA transmits the PS-Poll to the AP 1, if the AP 1 has data to be transmitted to the first STA, the AP 1 transmits ACK frame in response to the PS-Poll, wherein the ACK frame includes CTS request information together with MoreData=1, RspFrm=00.

The CTS request included in the ACK frame indicates information requesting CTS transmission if a receiving STA (STA 1 in the drawing) of the ACK frame receives ACK. Since the second STA (STA 2) sets NAV by using duration information included in the CTS frame, when the AP 1 transmits data to the first STA (STA 1), the second STA (STA 2) does not perform data transmission. If the second STA (STA 2) is a power saving (PS) mode STA, the second STA may identify SIG field of the PS-Poll transmitted from the first STA (STA 1) and skip decoding of the other PS-Poll frame part (MPDU) as the PS-Poll frame does not correspond to the STA 2. Also, since RspFrm (or ACK indication) of the SIG field of the PS-Poll is set to 00, the second STA may enter the sleep state for a total (PS-Poll MPDU frame length+SIFS+ACK frame) [us] to reach SIFS+ACK frame as well as for MPDU decoding of the PS-Poll, whereby power consumption may be reduced. Even though the channel is idle within the corresponding period, data transmission is not performed, whereby ACK transmission of the hidden node may be protected. Afterwards, the second STA may set its NAV by overhearing CTS transmitted from the first STA (STA 1), and also may enter the sleep state.

CTS request information may be transmitted by being included in the SIG field of the ACK frame. For example, 1 bit of reserved bits may be used, or a value which is not used during ACK frame transmission may be used to indicate CTS request. Alternatively, CTS request information may be indicated by a bit or value of 2 bytes of MAC header, wherein the bit or value is not used in a frame control (FC) field. For example, if a value of More Frag field set to 1 is transmitted during ACK frame transmission, the STA that has received the ACK frame will transmit CTS frame after SIFS, and CTS duration will be set on the basis of duration included in the ACK frame (Total duration−SIFS−CTS frame size). For another example, a Retry field value may be set to 1. Alternatively, a value (for example, Type=0b11 Subtype=1111) which is not used in combination of Type+ subtype may be defined as ACK frame indicating CTS request. In this case, since a new ACK frame has the same field as that of the existing ACK frame, its size is the same as that of the existing ACK frame.

FIG. 20(b) illustrates that CTS request in FIG. 20(a) is ACK request. That is, information including request of ACK frame as the third frame may be included in the ACK frame which is the second frame. In this case, the first STA that has received the second frame may transmit ACK frame as the third frame, and the AP 1 (or STA) that has received the third frame may transmit data after SIFS. Since FIG. 20(b) is the same as the description of FIG. 20(a) except that the CTS frame is changed to the ACK frame, its detailed description will be replaced with the description of FIG. 20(a).

FIG. 21 illustrates that the second frame is RTS frame, and the third frame is CTS frame. That is, in FIG. 21, the AP 1 that has received the PS-Poll frame in FIG. 20 transmits RTS frame, and the first STA transmits CTS frame. Detailed description of FIG. 21 will be replaced with the description of FIG. 20. However, in FIG. 21(a), RspFrm=00 means normal ACK. A normal ACK frame size is 14 bytes including 4 bytes FCS, and the RTS frame size is 20 bytes. Accordingly, when the first STA (STA1) transmits the PS-Poll, if RspFrm is set to 00, the second STA (STA2) sets NAV as much as ACK frame size (14 bytes). In this case, if the RTS frame of 20 bytes is transmitted as above, the RTS frame may exceed NAV. In this case, the second STA (STA2) may indicate frame transmission while the AP1 is transmitting the RTS, whereby frame collision may be caused. As shown in FIG. 21(b), when the STA transmits PS-Poll (or unsolicited PS-Poll), the STA sets RspFrm value to 11 (other special frame in addition to ACK, BA, CTS frame) instead of 00 (ACK). In this case, since the second STA (STA 2) is a power saving (PS) mode STA and RspFrm=11 is set when the second STA receives the PS-Poll, the second STA performs corresponding frame decoding by waking up to identify what packet is transmitted, after SIFS after transmitting the PS-Poll even though the PS-Poll does not correspond thereto.

Subsequently, referring to FIG. 21(b), when the first STA (STA 1) transmits the PS-Poll by waking up from the sleep state, the first STA (STA1) sets RspFrm to 11 while expecting RTS. If the AP1 receives the PS-Poll frame from the first STA (STA 1), the AP1 transmits the RTS frame in response to the PS-Poll frame after SIFS. If the second STA (STA 2) is a power saving (PS) mode STA, the second STA (STA 2) may identify SIG field of the PS-Poll transmitted from the first STA (STA 1) and skip decoding of the other PS-Poll frame part as the PS-Poll frame does not correspond to the STA 2. Also, since RspFrm (or ACK indication) of the SIG field of the PS-Poll is set to 11, the second STA (STA 2) defers transmission as much as MAX_PPDU+2*SIFS+ PHY-RXSTARTDelay. Afterwards, the second STA (STA 2) may set its NAV by overhearing CTS frame transmitted from the first STA (STA 1), and also may enter the sleep state for the NAV. However, since the deferred time is longer than RTS frame transmission, it is not efficient.

Accordingly, an information field indicating the RTS frame may be included in the PS-Poll frame. For example, MoreFrag or Retry field may be set to 1. In this case, for DL data transmission, the AP may initiate an RTS/CTS protection scheme in accordance with RTS transmission. The STAs that have overheard the PS-Poll of which MoreFrag or Retry field is set to 1 may set NAV to (2*SIFS+RTS frame+RXSTARTDelay) to reduce unnecessary channel defer.

Figure 22:
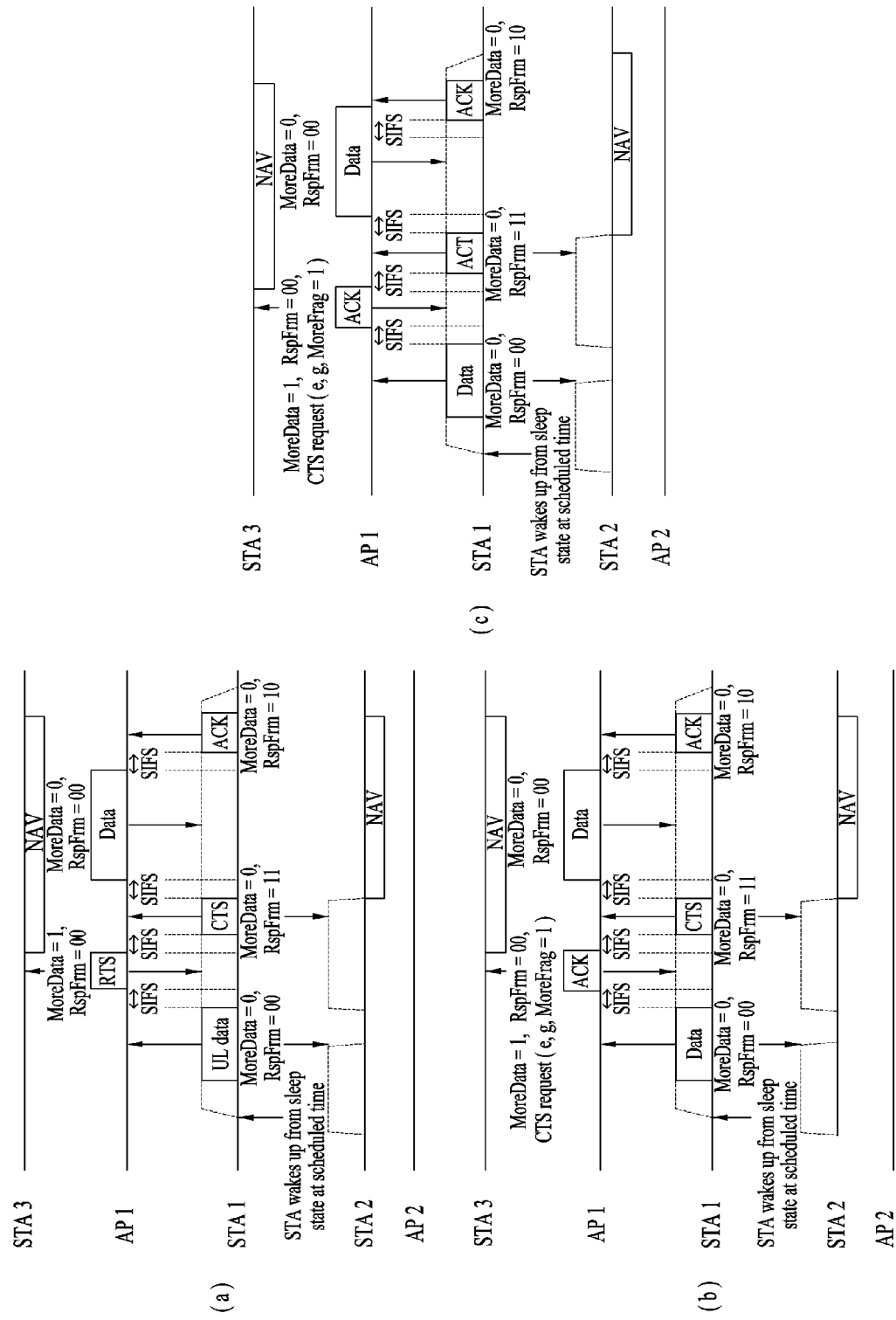

FIG. 22 illustrates that the first frame is UL data frame. If the AP 1 receives UL data from the first STA, the AP 1 may reserve channel use by transmitting the second frame (RTS frame (FIG. 22(a)) and ACK frame (FIGS. 22(b) and 22(c)) that includes CTS request. The first STA that has received the second frame may transmit CTS (or ACK including CTS function) frame to the second STA to allow the second STA to set the NAV.

Figure 23:
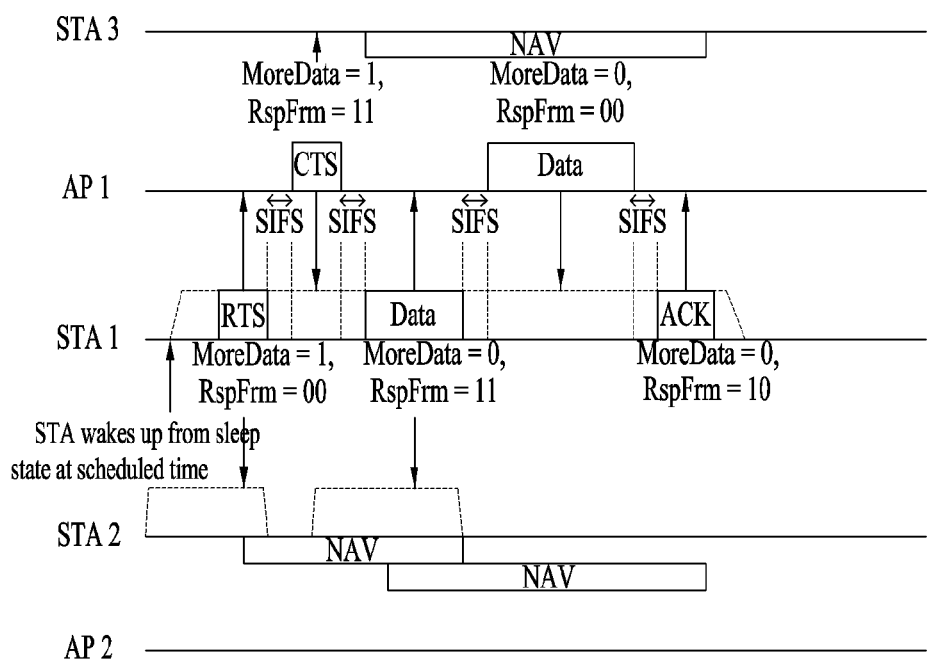

FIG. 23 illustrates that the first frame is RTS frame and the second frame is CTS frame. Referring to FIG. 23, the first STA (STA 1) may transmit RTS before transmitting UL data to the AP 1 and may set a duration field of RTS on the basis of a size of UL data. At this time, MoreData field of RTS may be set to 1 (data indication), and RspFrm (ACK indication) may be set to 00 (because of CTS). The AP 1 transmits CTS in response to the RTS. At this time, since there are DL data, duration of CTS is set to (UL data+SIFS+ DL data+SIFS+ACK), and More Data field is set to 1, and RspFrm is set to 11. When the first STA (STA 1) transmits UL data to the AP 1 by receiving CTS, the first STA may again set the duration field of the UL data on the basis of the CTS, set MoreData field to 0, and RspFrm to 11. The AP 1 that has received data from the first STA (STA 1) may transmit DL data of which MoreData field is set to 0 and RspFram is set to 00, in response to the data.

Figure 24:
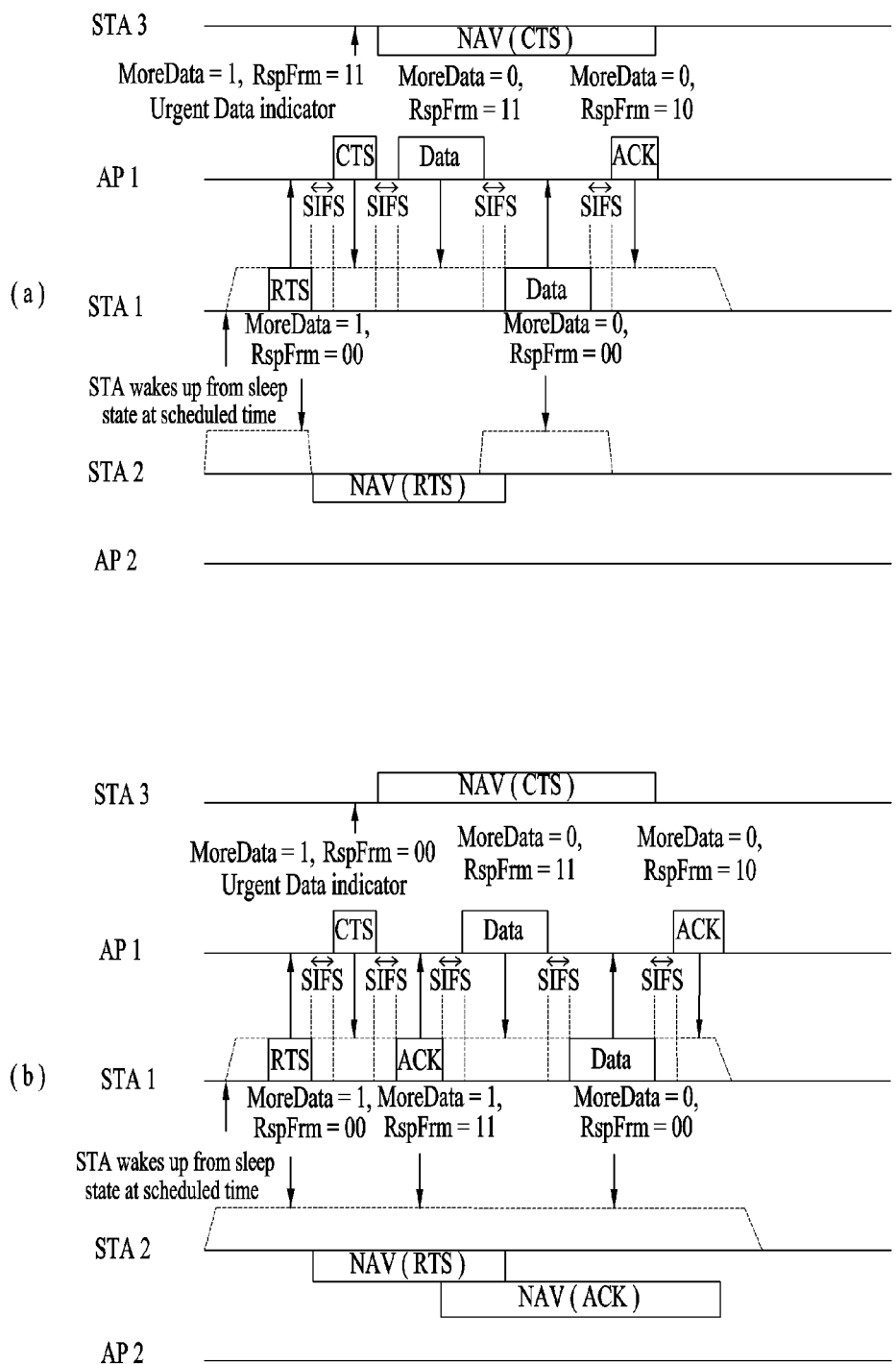

FIG. 24 illustrates that the second frame includes an urgent data indicator. Referring to FIG. 24(a), when the first STA (STA 1) receives CTS, if an urgent DL data indicator exists in the CTS, the first STA defers UL data transmission and waits for DL data reception. In this case, the urgent data indicator may be included in the second frame only if the urgent data indicator has a size smaller than the data frame to be received by the AP to avoid interference caused by a hidden node. Such a limitation in use of the urgent data indicator may be resolved in such a manner that the STA further transmits ACK (or CTS) frame after receiving CTS frame as shown in FIG. 24(b). The second STA that has received/overheard the ACK (or CTS) frame may again set the NAV. That is, the STA that has received the urgent data indicator and CTS including RspFrm=00 transmits ACK after SIFS. The duration field of ACK is set by recalculated based on the CTS. Accordingly, the STAs that have received RTS may receive ACK and again set the NAV based on the duration included in the ACK.

Figure 25:
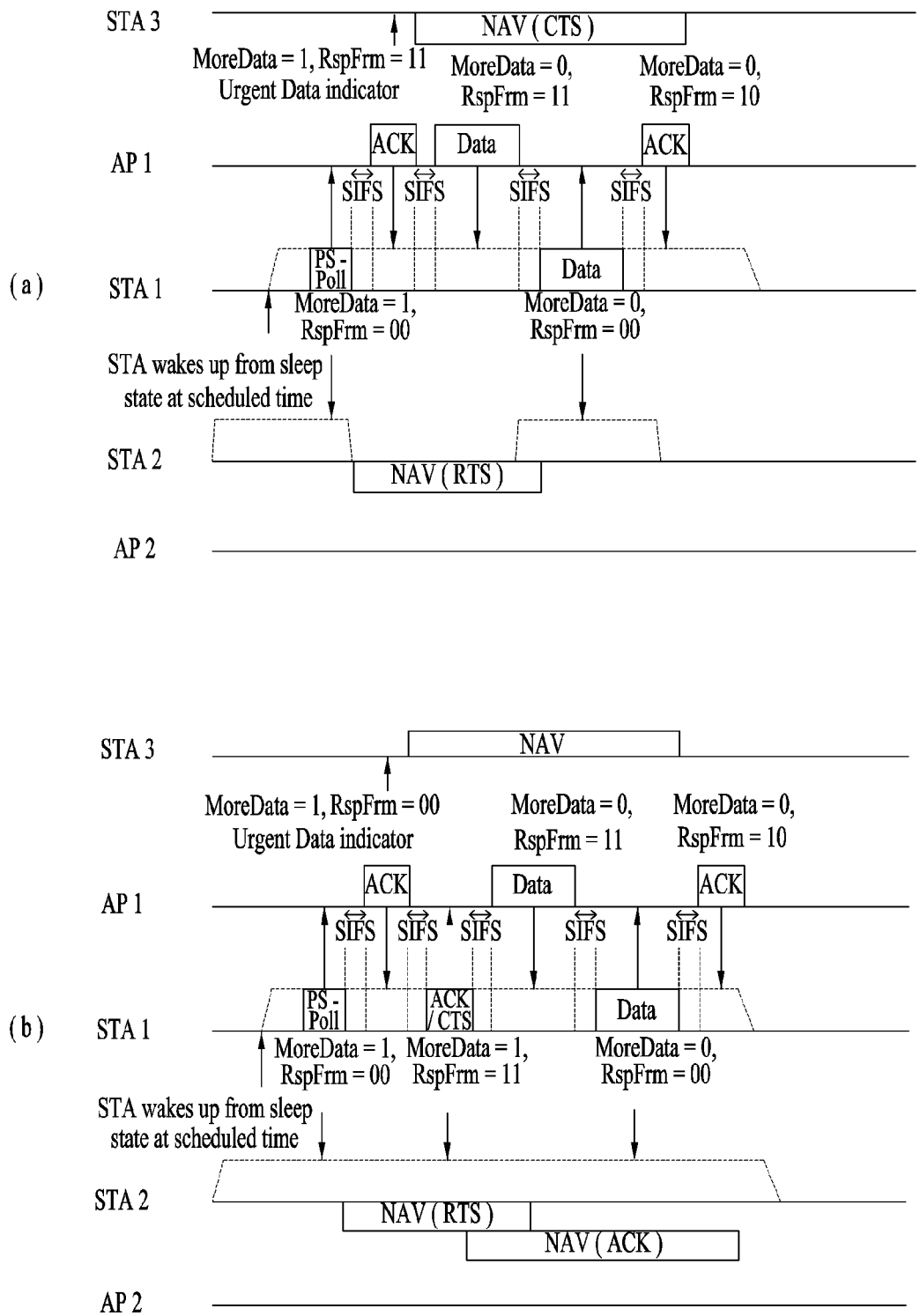

FIG. 25 illustrates that PS-Poll frame is used instead of RTS frame of FIG. 24. The description of FIG. 25 will be replaced with the description of FIG. 24.

The aforementioned various embodiments of the present invention may independently be implemented, or two or more embodiments may simultaneously be implemented.

Figure 26:
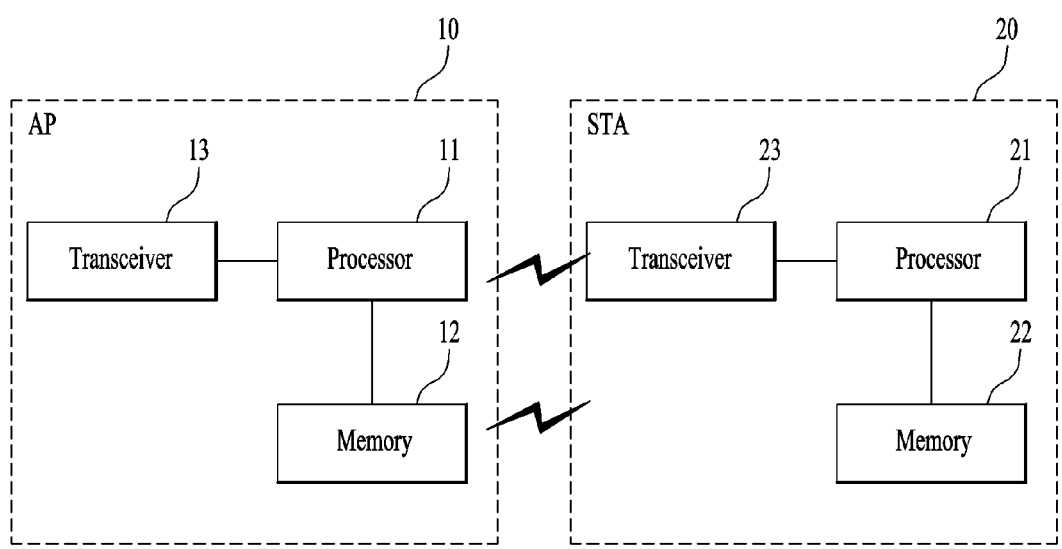
FIG. 26 is a block diagram illustrating a configuration of a wireless apparatus according to one embodiment of the present invention.

FIG. 26 is a block diagram illustrating a configuration of a wireless apparatus according to one embodiment of the present invention.

The AP 10 may include a processor 11, a memory 12, and a transceiver 13. The STA 20 may include a processor 21, a memory 22, and a transceiver 23. The transceiver 13 or 23 may transmit and receive a radio signal, and for example, may implement a physical layer according to the IEEE 802 system. The processor 11 or 21 may electrically be connected with the transceiver 13 or 23 to implement the physical layer and/or MAC layer according to the IEEE 802 system. Also, the processor 11 or 21 may be configured to perform one or more operations according to the aforementioned various embodiments of the present invention. Also, modules for implementing the operation of the AP and the STA according to the aforementioned various embodiments of the present invention may be stored in the memory 12 or 22, and may be implemented by the processor 11 or 21. The memory 12 or 22 may be included inside or outside the processor 11 or 21, and may be connected with the processor 11 or 21 by a well known means.

The detailed configuration of the AP and the STA may be implemented in such a manner that the aforementioned various embodiments of the present invention may independently be applied thereto, or two or more embodiments may simultaneously be applied thereto. The repeated description of the detailed configuration of the AP and the STA will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention. Those skilled in the art will appreciate that the present invention may be carried out in other specific ways than those set forth herein without departing from the spirit and essential characteristics of the present invention. The above embodiments are therefore to be construed in all aspects as illustrative and not restrictive.

INDUSTRIAL APPLICABILITY

Although the aforementioned various embodiments of the present invention have been described based on the IEEE 802.11 system, they may be applied to various mobile communication systems in the same manner.

The invention claimed is:

1. A method for transmitting a signal of an access point (AP) in a wireless communication system, the method comprising:
receiving a power save (PS)-poll frame from a first station (STA);
transmitting a second frame including a response to the PS-Poll frame to the first STA, wherein the second frame is either a first acknowledgement (ACK) frame or a request to send (RTS) frame,
wherein the second frame includes an indicator requesting the first STA to transmit a third frame to allow second STA to set a network allocation vector (NAV), and wherein the second STA is an STA unable to sense the AP;

receiving the third frame from the first STA, wherein the third frame is either a second ACK frame or a clear to send (CTS) frame;

transmitting a data frame to the first STA, the data frame including downlink data; and receiving a third ACK frame which is a response to the downlink data from the first STA, wherein when the second frame is the RTS frame, the PS-Poll frame includes information indicating that a frame other than the first ACK frame will be transmitted after a short interface space (SIFS).

2. The method according to claim 1, wherein the NAV set after the second STA receives the third frame has a length of (2*SIFS+length of the data frame+length of the third ACK frame) or more.

3. The method according to claim 1, wherein the third frame includes information indicating that data is transmitted after the SIFS even though there is no data to be transmitted from the first STA.

4. The method according to claim 3, wherein the third frame includes a MoreData field value set to 0.

5. An access point (AP) in a wireless communication system, the AP comprising:

a processor configured to:

receive a power save (PS)-poll frame from a first station (STA);

transmit a second frame including a response to the PS-Poll frame to the first STA, wherein the second frame is either a first acknowledgement (ACK) frame or a request to send (RTS) frame, wherein the second frame includes an indicator requesting the first STA to transmit a third frame to allow a second STA to set a network allocation vector (NAV), and wherein the second STA is an STA unable to sense the AP;

receive the third frame from the first STA, wherein third frame is either a second ACK frame or a clear to send (CTS) frame;

transmit a data frame to the first STA, the data frame including downlink data; and receive a third ACK frame which is a response to the downlink data from the first STA, wherein when the second frame is the RTS frame, the PS-Poll frame includes information indicating that a frame other than the first ACK frame will be transmitted after a short interface space (SIFS).

* * * * *